United States Patent Office 2,941,923
Patented June 21, 1960

2,941,923
TOXICANT CARRIER

Charles Gerald Albert, Basking Ridge, N.J., assignor to Minerals & Chemicals Corporation of America, Menlo Park, N.J., a corporation of Maryland No Drawing. Filed Jan. 14, 1958, Ser. No. 708,756

18 Claims. (Cl. 167—42)

The present invention relates to a novel mineral composition, said composition being useful as a carrier for a thiophosphate ester toxicant.

The thiophosphate ester toxicants have the following general formula:

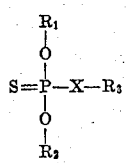

in which $R_1$ and $R_2$ are members of the group consisting of aliphatic hydrocarbon radicals and halogen substituted aliphatic radicals and may be alike or different and may be branched or straight chain, saturated or unsaturated, or cycloaliphatic radicals. Typical radicals include methyl, ethyl, n-propyl, isopropyl, isobutyl, tert.-butyl, n-amyl, sec.-amyl, n-hexyl, 2-ethylhexyl, n-octyl, n-decyl, n-dodecyl, oleyl, cetyl, ceryl, allyl, 2-chloroallyl, cyclohexyl, bromomethyl and 2-chloroethyl. In these compositions X is selected from the group consisting of sulphur and oxygen and $R_3$ may be an alkyl, aryl or heterocyclic radical containing various functional groups, examples of which are hereinafter illustrated.

Typical species in which X is oxygen include: parathion, O,O-diethyl-O-p-nitrophenyl thiophosphate; methyl parathion, O,O-dimethyl-O-p-nitrophenyl thiophosphate; and diazinon, O,O-diethyl-O(2 - isopropyl - 4 - methylpyrimid-6-yl)-thiophosphate. Species in which X is sulphur include: malathion, S(1,2-dicarbethoxyethyl)-O,O-dimethyl(S-ethyl mercaptomethyl)dithiophosphate. Other typical dithiophosphate ester toxicants include S-tert.-butyl-mercaptomethyl O,O-diethyl dithiophosphate, S-sec.-amyl mercaptomethyl O,O-diethyl dithiophosphate, S-N-butoxymethyl O,O-bis(2-chloroethyl) dithiophosphate, S-tert.-butylmercaptomethyl O,O-bis(2 - chloroethyl)dithiophosphate.

Thiophosphate ester toxicants are high boiling liquids of poor water solubility, but soluble in organic liquids including ketones, such as acetone, methyl ethyl ketone and cyclohexanone, monohydric aliphatic alcohols, esters including acetates, phthalates, abietates, fumarates and maleates, ether alcohols, petroleum oils, animal and vegetable oils and ketone-alcohols such as diacetone alcohol.

These toxicants are frequently formulated with liquid or gaseous vehicles, the particular type vehicle depending on the mode of application to the insect. It is frequently desirable to supply these toxicants as dry formulations, such as dusts, wettable powders and granular compositions, in which the toxicant is sorbed on the surface of a particulate mineral carrier and is readily released thereby when the composition is applied to crops. Frequently these initial compositions are further diluted or "let-down" with low sorptive, particulate materials such as gypsum, talc and kaolinite. The desiderata of an ideal mineral carrier are: low cost, good flow properties, low bulk density, high sorptivity for the toxicant and negligible effect on the potency of the active ingredient impregnated thereon over prolonged storage of the composition. It has been found that some carriers, particularly siliceous mineral carriers such as Attapulgus fuller's earth, certain montmorillonite clays, mixtures of these clays, or mixtures of these clays with other clay minerals such as kaolinitic clays, and diatomaceous earth have a strong tendency to catalyze the decomposition of a thiophosphate-type toxicant sorbed on the mineral whereby the resultant insecticidal compositions have only a short shelf life; after a few months of storage such compositions have inadequate insecticidal potency.

Accordingly, it is a principal object of the invention to provide a particulate siliceous mineral carrier composition in which the mineral is treated to curtail the tendency of said mineral to promote the decomposition of a thiophosphate ester toxicant subsequently sorbed thereon.

Another object of the invention is to provide a siliceous mineral composition which fulfills the above-described desiderata of an ideal carrier for a thiophosphate toxicant, the mineral component of said composition being one that heretofore had limited use for the purpose because of its tendency to degrade a thiophosphate ester toxicant carried thereby.

Other objects and advantages of my invention will be apparent from the description thereof which follows.

The instant invention is a result of my discovery that siliceous minerals which are prone to decompose thiophosphate ester toxicants carried thereby may be deactivated to curtail this deleterious effect if said carrier is treated, prior to sorption thereon of said toxicant, with a chelating agent of a character hereinafter to be described. Chelating agents useful in compositions of my invention are compatible with thiophosphate ester toxicants and are, in general, characterized by oleophilic properties, it having been found that carriers are not deactivated to an equally satisfactory degree by treatment with similar quantities of hydrophilic chelants. The term "compatible" as used herein refers to systems in which components are capable of coexisting in the same liquid phase or can coexist in the same liquid phase by employment of a mutual solvent for the components. Minerals heretofore useful as carriers for thiophosphate ester toxicants only when short storage was expected to be encountered may, by virtue of practices of principles herein taught, be used under conditions of prolonged storage without deleterious loss of toxicant activity. Compositions of my invention comprise a siliceous mineral treated with a chelating agent, said chelating agent being either one which is soluble in a thiophosphate ester toxicant or one which may be rendered soluble in said toxicant by use of a mutual solvent for said chelant and said toxicant. It will be understood that the term "chelating agent" as used herein refers to any material which reacts with metallic ions, particularly metallic ions above vanadium in the periodic series, and reduces or prevents the ionization of said ions. A useful class of chelants within the genus of toxicant soluble compounds are totally hydroxypropylated derivatives of alkylene diamines broadly defined by the formula:

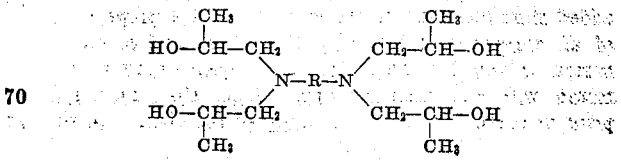

wherein R is an alkylene radical containing from 2 to 6 carbon atoms. Examples of alkylene diamines that can be totally hydroxypropylated are ethylene diamine, propylene diamine, butylene diamine, and hexamethylene diamine. A typical specie is N,N,N',N'-tetrakis(2-hydroxypropyl)-ethylene diamine. Another class includes the totally hydroxyethylated alkylene diamines of a structure similar to that of the totally hydroxypropylated alkylene diamines, a specie being N,N,N',N',-tetrakis-(beta-hydroxyethyl)ethylene diamine; within this class the alkylene radical may contain from 2 to 6 carbon atoms. Other suitable chelating agents include Schiff bases prepared by reaction of salicylaldehyde or O-hydroxyacetophenone and diamines, species thereof including N,N'-disalicylidimethylene diamine, N,N'-disalicylidinepropylene diamine, a,a'-(ethylenedinitrilo)di-O-cresol (carboxymethylthio)succinic acid, and a,a'-(propylenedinitrilo)di-O-cresol (carboxymethylthio)succinic acid. Diamines useful in preparation of Schiff bases have 2–6 carbon atoms.

Another genus of suitable conditioning agents include those materials capable of chelating metallic ions, particularly above vanadium in the periodic series, which may be dissolved in the thiophosphate ester by use of a mutual solvent. Compounds falling within this class include ethylene diamine tetra-acetic acid and hydroxylalkylated glycine, typified by N,N'-di(2-hydroxyethyl)glycine. Another suitable class includes salicylidene derivatives of alkylene diamines having from 2 to 6 carbon atoms in the alkylene radical, typified by N,N'-disalicylidene-1,2-propane diamine.

Suitable mutual solvents include aromatic hydrocarbons such as benzene, toluene, xylene, the polymethylated naphthalenes, the polyethylene glycols and various solvent mixtures.

Siliceous materials which may be used as carriers for thiophosphate esters without deleterious effect when said mineral is deactivated by means herein taught include Attapulgus fuller's earth, kieselguhr, certain sorptive montmorillonite clays and mixtures thereof. Kaolin clay may be used, although preferably in combination with a sorptive clay such as Attapulgus fuller's earth or a sorptive montmorillonite clay. Attapulgus fuller's earth, preferably activated to destroy its gel-forming properties, is a particularly valuable carrier for a thiophosphate ester toxicant when a suitable conditioner is present because of its high sorptivity, low bulk density, superior flow characteristics, low price and ability to steadily release sorbed material. Attapulgus fuller's earth comprises the mineral attapulgite and may contain minor amounts of montmorillonite and sepiolite. The earth is suitably activated by heating at temperatures of the order of 500–1000° F. for about ½ to 1 hour. Montmorillonite clays and other siliceous carriers may also be heat activated to improve their sorptivity prior to inclusion in compositions of my invention, such activation procedures being well-known to those skilled in the art.

Deactivated thiophosphate ester-mineral carrier compositions of my invention may be prepared by impregnating the chelating agent and the toxicant onto the carrier by milling, spraying or solvent spraying technique, such techniques being known to those skilled in the art. The carrier, thus deactivated, may be impregnated with the thiophosphate ester toxicant by any milling technique which insures adequate distribution and substantial homogeneity of the components of the deactivated carrier. If desired, the chelating agent and toxicant may be added simultaneously to the carrier. In the preparation of all compositions including a solid mineral carrier a mutual solvent for the chelant and toxicant may be admixed with the chelating agent either simultaneously, prior or subsequent to the addition of the chelant to the carrier to assure the adequate distribution of that material on the carrier.

The amount of deactivator required to stabilize a thiophosphate ester toxicant is independent of the quantity of toxicant present and depends on the severity of deteriorative conditions which the toxicant is expected to encounter during storage or handling. Accordingly compositions of my invention encompass a wide ratio of toxicant to deactivator ratios. When a mineral carrier is used in combination with deactivator and toxicant the optimum deactivator concentration is best determined experimentally for that particular carrier stock, since the tendency of a mineral specie to catalytically degrade a thiophosphate ester toxicant varies with source, processing and imponderable factors.

The following examples and accompanying descriptions are given only for the purpose of better illustrating the invention and are not to be construed as limiting the scope thereof.

EXAMPLE I

A stabilized pesticidal dust composition was prepared using Attapulgus fuller's earth as the carrier and malathion as the toxicant. 0.25 part by weight of N,N,N',N'-tetrakis(2-hydroxypropyl) ethylene diamine was dissolved in 5 parts by weight of a technical grade of malathion. The solution was dripped onto Attapulgus fuller's earth while said earth was mixed in a Hobart mixer. The formulation was blended in the Hobart mixer for 20 minutes, passed through a hammer mill twice and post-blended on a roller-mill for 3 minutes. The clay used was Attaclay, a powdered grade of Attapulgus fuller's earth made and sold by Minerals and Chemicals Corporation of America and having the following specifications:

*Typical chemical composition*
[Volatile-free basis]

| | |
|---|---|
| $SiO_2$ ___percent__ | 67.0 |
| $Al_2O_3$ ___do____ | 12.5 |
| MgO ___do____ | 11.0 |
| $Fe_2O_3$ ___do____ | 4.0 |
| CaO ___do____ | 2.5 |
| Others ___do____ | 3.0 |
| Average particle size (microns) | 18 |
| Oil absorption (ASTM D–281–31) | 99 |
| pH (of water slurry) | 7.0–8.0 |
| Bulk density (lbs./cu. ft.) | 27–31 |

The pesticidal dust composition thus formulated was subjected to an accelerated decomposition test by subjecting the sample in a sealed jar to a temperature of 40° C. for a month to accelerate any breakdown tendency of the toxicant during the storage period. While a compound may be unstable at 40° C., it may, nevertheless display good stability characteristics at room temperature. It has been observed that the results of such accelerated tests conducted to determine the stability of toxicants sorbed on a mineral carrier, such as Attaclay, correspond to the stability data for like compositions during storage for much longer periods of time at room temperature. At the end of the storage period during which the malathion composition was held in a sealed jar at about 40° C. for the purpose of studying the stability of the toxicant under the test conditions, the residual malathion concentration was ascertained by a method hereinafter described and was recorded as the percentage of malathion chemically decomposed during the storage period.

The determination of malathion was made by the so-called "carbon tetrachloride method," a colorimetric analytical procedure for the quantitative analysis of technical grade malathion. Malathion, S-(1,2 dicarbethoxyethyl)-O,O-dimethyl dithiophosphate is decomposed by alkali in carbon tetrachloride-ethanol solution to O,O-dimethyl dithiophosphate, sodium fumarate and ethanol. The sodium O,O-dimethyl dithiophosphate is then converted to the cupric complex which is soluble in carbon tetrachloride with the formation of an intense yellow color. The color intensity is proportional to the concentration of O,O-dimethyl dithiophosphoric acid and is measured colorimetrically at 418 mu, the absorption peak. The corresponding amount of insecticide is then ascertained by comparison with a standard curve prepared from known amounts of pure insecticide carried through the procedure. In the method dilute alkaline and acid washes are used to remove materials which would reduce cupric ions to cuprous ions. With dithiophosphoric acids cuprous ions form a colorless complex which is more stable than the yellow cuproic complex.

To prepare the standard curve for malathion dissolve approximately 0.25 g. (weighed to 0.1 mg.) of pure malathion in 2-B ethanol contained in a 250 ml. volumetric flask. Dilute to the mark with 2-B ethanol. Mix well, transfer a 25 ml. aliquot to a second 250 ml. volumetric flask, and dilute to the mark with 2-B ethanol. One ml. of this solution is equivalent to 0.1 mg. of malathion. Carry 0, 2.5, 5, 10, 15, 20 and 25 ml. aliquots of the standard solution through the following procedure.

Transfer each aliquot to a 250 ml. separatory funnel containing sufficient 2-B ethanol to make a total volume of exactly 25 ml. of ethanol. Add 1 ml. of 1% $CS_2$ in 90 ml. of carbon tetrachloride. Mix well by swirling gently. Add 75 ml. of 2% NaCl solution (cooled to 15° C.), containing 1 ml. of 0.1 N NaOH and shake vigorously for exactly 1 minute. Allow the layers to separate and draw off the carbon tetrachloride layer into a clean, dry 250 ml. separatory funnel. Wash the aqueous layer once with 10 ml. of carbon tetrachloride by shaking for 15 seconds, allow the phases to separate and add the carbon tetrachloride layer to the main carbon tetrachloride solution, making certain that no water is transferred to the separatory funnel containing the carbon tetrachloride layers. Discard the alkaline salt solution.

Add 25 ml. of 2-B ethanol to the carbon tetrachloride extract and swirl to mix. Add 1 ml. of 6 N NaOH and shake exactly 1 minute. Immediately add 75 ml. of 2% NaCl solution (cooled to 15° C.) and shake for exactly 1 minute. Allow the phases to separate and discard the carbon tetrachloride layer. Wash the aqueous solution with 25 ml. of carbon tetrachloride by shaking for 30 seconds. Discard the carbon tetrachloride layer.

Add 25 ml. of carbon tetrachloride and 1 ml. of 7 N HCl to the aqueous layer and shake for 30 seconds. Allow the phases to separate and discard the carbon tetrachloride layer. Wash the aqueous solution with 25 ml. of carbon tetrachloride by shaking for 30 seconds. Drain off the carbon tetrachloride as completely as possible and discard.

To the aqueous phase remaining in the separatory funnel add from a pipette 50 ml. of carbon tetrachloride and then 2 ml. of copper sulfate solution. Immediately shake for 1 minute and allow the phases to separate. Immediately measure the absorbance of the yellow solution at 420 mu using carbon tetrachloride as the reference.

Prepare the standard curve by plotting the absorbance of each of the above aliquots vs. the mg. of malathion.

To analyze the powders containing malathion, a sample is weighed to the nearest milligram into a volumetric flask and diluted to the mark with 2-B ethanol. Serial dilutions are made so that the final amount of malathion analyzed is 1.0 to 1.5 mg.

Samples of pesticidal compositions containing about 5 per cent by weight of malathion were chosen for observation since absolute decomposition, based on the original weight of malathion present would show up better than if observations were made on a higher concentration powder, such as 25 percent malathion. On an absolute basis, decomposition should be substantially identical for 5 percent and 25 percent malathion formulations. It is to be clearly understood that a 5 percent malathion concentration was chosen merely to magnify decomposition effects and not to restrict the scope of the invention to such a composition. An inexpensive, inactive, relatively nonsorptive carrier may be added to formulations to produce field strength compositions.

When no deactivator was used in conjunction with Attaclay, 70 percent of the malathion was decomposed under the test conditions; the addition of only 0.25 percent of the chelating agent (based on the weight of the formulations) resulted in an average decomposition of 23 percent.

EXAMPLE II

The tendency of Pike's Peak clay to catalyze the decomposition of parathion can be minimized by sorbing a small amount of N,N,N'-(beta-hydroxyethyl) ethylene diamine on the carrier. To prepare a granulated toxicant formulation of improved stability spray 0.25 part by weight of N,N,N'-(beta-hydroxyethyl) ethylene diamine on 95 parts of the granular clay and thoroughly blend the composition.

EXAMPLE III

A stable cockroach dust is prepared by thoroughly milling 25 parts by weight powdered Attapulgus fuller's earth with 1 part by weight of S-tert.-butylmercaptomethyl O,O-bis(2-chloroethyl) dithiophosphate having dissolved therein 0.5 part by weight of N,N,N',N'-tetrakis(2 - hydroxypropyl)propylene diamine. To the milled mixture 75 parts by weight of kaolin clay is added.

EXAMPLE IV

Powdered Attapulgus fuller's earth may be treated to render it capable of carrying an oil-soluble thiophosphate ester toxicant without substantial deleterious effect on the stability of that toxicant by spraying a solution of N,N'-disalicylidene-1,2-propane diamine in toluene in amount sufficient to deposit 0.75 part by weight of N,N'-disalicylidene-1,2 propane diamine on 100 parts by weight of earth. The earth and sorbed deactivator should be thoroughly blended suitably in a hammer mill followed by post-blending on a roller mill.

EXAMPLE V

This example illustrates the deactivation of Attapulgus fuller's earth by a chelating agent solubilized in a thiophosphate ester toxicant by a mutual solvent for said toxicant and said ester. 0.25 part by weight of ethylene diamine tetra-acetic acid dissolved in 5.0 parts by weight of tall oil was dripped onto 100 parts of Attaclay simultaneously with the addition of 5.0 parts by weight of malathion. The formulation was blended for 20 minutes, passed twice through a hammer mill and post-blended for 3 minutes on a roller-mill. As reported in Example I the Attaclay in the absence of deactivator decomposed 70 percent of the malathion under test conditions while only 20.1 percent of malathion was decomposed in the dust composition of the instant example.

It will be understood that the invention is susceptible to numerous variations without departing from the spirit and scope thereof. For example, carriers within the scope of my invention may be dusts, wettable powder or granular compositions and may or may not be let down with low sorptive particulate diluents, such diluents being deactivated as herein taught when they are of a siliceous character.

I claim:

1. A carrier for a thiophosphate ester toxicant comprising discrete particles of a siliceous mineral, said particles having sorbed thereon a totally hydroxypropylated alkylene diamine.

2. The carrier of claim 1 in which the siliceous mineral is attapulgite.

3. The carrier of claim 1 in which the siliceous mineral is diatomaceous earth.

4. The carrier of claim 1 in which the siliceous mineral is montmorillonite.

5. A carrier for a thiophosphate ester toxicant comprising discrete particles of a siliceous mineral, said particles having sorbed thereon a totally hydroxyethylated alkylene diamine.

6. A carrier for a thiophosphate ester toxicant comprising discrete particles of a siliceous mineral, said particles having sorbed thereon the reaction product of salicylaldehyde and an alkylene diamine.

7. A carrier for a thiophosphate ester toxicant comprising discrete particles of a siliceous mineral, said particles having sorbed thereon the reaction product of O-hydroxyacetophenone and an alkylene diamine.

8. A carrier for a thiophosphate ester toxicant comprising discrete particles of Attapulgus fuller's earth, said particles having sorbed thereon a minor amount of a totally hydroxypropylated alkylene diamine.

9. A carrier for a thiophosphate ester toxicant comprising discrete particles of Attapulgus fuller's earth, said particles having sorbed thereon a minor amount of N,N,N',N'-tetrakis (2-hydroxypropyl) ethylene diamine.

10. A carrier for a thiophosphate ester toxicant comprising a thermally activated siliceous mineral, said mineral having sorbed thereon an oleophilic chelating agent in quantity sufficient to reduce substantially the tendency of said carrier to promote the decomposition of a thiophosphate ester toxicant when sorbed thereon.

11. The carrier of claim 10 in which the siliceous mineral is attapulgite.

12. The carrier of claim 10 in which the siliceous mineral is montmorillonite.

13. The carrier of claim 10 in which the siliceous mineral is kaolinite.

14. The carrier of claim 10 in which the siliceous mineral is diatomaceous earth.

15. The carrier of claim 10 in which the chelating agent is a totally hydroxypropylated alkylene diamine.

16. The carrier of claim 10 in which the chelating agent is a totally hydroxyethylated alkylene diamine.

17. The carrier of claim 10 in which the chelating agent is the reaction product of salicylaldehyde and an alkylene diamine.

18. The carrier of claim 10 in which the chelating agent is the reaction product of O-hydroxyacetophenone and an alkylene diamine.

References Cited in the file of this patent

UNITED STATES PATENTS

| | | |
|---|---|---|
| 2,043,257 | Missbach | June 9, 1936 |
| 2,522,311 | Smith | Sept. 12, 1950 |
| 2,606,830 | Kamlet | Aug. 12, 1952 |
| 2,606,876 | Kamlet | Aug. 12, 1952 |

OTHER REFERENCES

Yost: "Malathion and Its Formulations," Agr. Chem., September 1955, pp. 43–45, 137 and 139.

Handbook of Aldrin, Dieldrin and Endrin Formulations, Shell Chem. Corp., N.Y.C., 1954, pp. 77–81.